Feb. 6, 1968  J. F. ELLIOTT  3,368,179

TEMPERATURE COMPENSATED SEMICONDUCTOR STRAIN GAGE

Filed March 30, 1966

INVENTOR:
JAMES F. ELLIOTT,

BY *Urban H. Faubion*

HIS ATTORNEY.

3,368,179
**TEMPERATURE COMPENSATED SEMI-
CONDUCTOR STRAIN GAGE**
James F. Elliott, Syracuse, N.Y., assignor to General
Electric Company, a corporation of New York
Filed Mar. 30, 1966, Ser. No. 538,687
5 Claims. (Cl. 338—3)

ABSTRACT OF THE DISCLOSURE

A compensated element for a semiconductor strain gage is provided wherein the gage element includes the semiconductor material connected mechanically in series with a compensating material which has a relatively high coefficient of linear thermal expansion compared to that of the semiconductor material and preferably the compensating material is composed of two equal lengths positioned at opposite ends of the segment of semiconductor material. Sensitivity is improved in a preferred arrangement by providing the compensating material with a cross-sectional area which is relatively large as compared to the cross-sectional area of the semiconductor segment.

---

This invention relates to strain gages and more particular to a semiconductor strain gage.

A strain gage is a device for converting a mechanical stress into an electrical indication. An extremely sensitive strain gage comprises a semiconductor material which, when subjected to stress, changes in dimension and electrical resistivity and therefore in overall resistance. By placing the semiconductor strain gage in an electrical measuring circuit such as a Wheatstone bridge circuit, mechanical stress in the strain gage existing due to external mechanical force can conveniently be measured. Such external force may be caused, for example, by acceleration, pressure, or stresses and strains in material. Another major reason why semiconductor strain gages are preferable to other types of strain gages is because semiconductors have a gage factor, i.e. change in resistivity per unit change in applied strain, that is several orders of magnitude greater than that associated with other types of strain gages. Thus, the sensitivity of a semiconductor strain gage is much better than other types.

However, semiconductor strain gages have a major disadvantage as compared with conventional types of strain gages in that they exhibit a relatively low coefficient of linear expansion with temperature compared to many of the materials in which stresses and strains are being measured. For example, the coefficient of linear expansion of semiconductor material such as germanium or silicon is much lower than that of steel, iron, or aluminum. This fact may lead to spurious strain indications if the temperature of the sample being tested, and therefore its dimensions, changes during the test. For example, suppose a silicon strain gage is applied to a steel sample at room temperature and then the temperature of the steel increases by 10° C. It can be shown mathematically that the change in physical dimension of the steel relative to the change in the silicon strain gage, caused by the temperature change, will register an apparent stress in the steel equal to 3,000 pounds per square inch. It would be desirable to alleviate this problem.

It is, therefore, an object of this invention to provide a temperature compensated semiconductor strain gage which eliminates spurious indications resulting from mismatch in coefficients of expansion between the strain gage and the material being tested.

Briefly, this invention comprises a semiconductor strain gage material placed mechanically in series with another type of compensating material that exhibits a relatively high coefficient of thermal expansion as compared to that of the semiconductor material. By designing the physical dimensions of the semiconductor material and the compensating material such that this latter material absorbs the major part of the apparent stress in the sample being tested due to temperature variations, a semiconductor strain gage is produced which is relatively insensitive to temperature variations.

My invention is particularly pointed out and distinctly claimed in the appended claims. The organization and method of operation of the invention, together with further objects and advantages thereof, may best be understood with reference to the following description taken in conjunction with the accompanying drawings in which:

Figure 1:
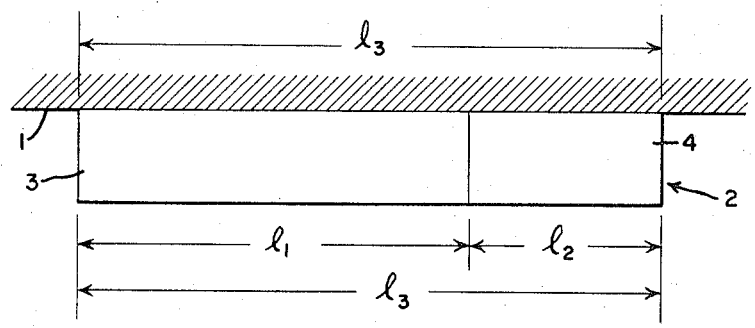
FIGURE 1 illustrates the basic principle of the present invention.

According to the invention a semiconductor strain gage is constructed in such a manner that the ratio of the change in length to the original length of the strain gage is equal to the ratio of the change in length to the original length of the sample being tested for any change in temperature. In mathematical symbols this is $(\Delta l/l)_{\text{gage}} = (\Delta l/l)_{\text{sample}}$ for any $\Delta T$. According to this invention this result is accomplished generally by placing the semiconductor material of the strain gage in series mechanically with another compensating material that has a high coefficient of linear thermal expansion. The changes in physical dimensions due to temperature changes of the resultant gage are then given by the mathematical relationship $$(\Delta l/l)_{\text{gage}} = a_1 l_1 \Delta T + a_2 l_2 \Delta T$$

where $a_1$ equals the coefficient of linear thermal expansion of the semiconductor material,
$l_1$ is the original length of the semiconductor material,
$a_2$ is the coefficient of linear thermal expansion of the material placed in series mechanically with the semiconductor material, and
$l_2$ is the original length of this material.

By setting this equation equal to the ratio of the change in length of the sample to its original length due to the same temperature change a strain gage with the desired properties can be achieved. Mathematically, therefore, the relationship is:

$$a_1 l_1 \Delta T + a_2 l_2 \Delta T = a_3 l_3 \Delta T$$

where $a_3$ equals the coefficient of linear thermal expansion of the sample and,
$l_3$ equals the original length of the sample.

Since the change in temperature is the same for both the strain gage and the sample being tested, the $\Delta T$ term drops off in the equation. The relationship is now:

$$a_1 l_1 + a_2 l_2 = a_3 l_3$$

In measuring the strain in a sample by means of a strain gage, the gage is placed immediately next to the sample being tested so that the important lengths to be considered in the above equations are those lengths of the strain gage and the sample which parallel each other. That is to say, the length of the sample being tested that is important in determining the design of an optimum strain gage is that length which is equal to the length of the strain gage. Therefore, $l_1 + l_2$ or the total length of the strain gage is equal to $l_3$ or the length of the sample being tested.

With this latter relationship in mind, the length of the semiconductor material which will achieve the desired characteristics can be solved for in terms of the length of the total strain gage and the coefficient of thermal expansion. Thus, $$l_1 = l_3(a_3-a_2)/(a_1-a_2)$$

With this equation it is possible to design a semiconductor strain gage for measuring stress in almost any material and the gage will be insensitive to temperature variations. For example, in testing steel with a coefficient of linear expansion, $a_3$, equal to $10 \times 10^{-6}$ per degree centigrade and utilizing silicon as a semiconductor material with a coefficient of linear thermal expansion, $a_1$, equal to $2 \times 10^{-6}$ per degree centigrade, a temperature insensitive gage can be made by placing aluminum with a coefficient of linear thermal expansion, $a_2$, equal to $25 \times 10^{-6}$ per degree centigrade in mechanical series with the semiconductor material. The equation then is:

$$l_1 = l_3(10-25)/(2-25) = {}^{15}\!/_{23}\, l_3$$

In other words, in order to produce a temperature insensitive semiconductor strain gage the length of the semiconductor material should be chosen to be ${}^{15}\!/_{23}$ of the total length of the strain gage.

Referring now to FIGURE 1 basic principle of the invention as described is illustrated by showing a cross section of a sample metal 1 in which strain is to be measured and a strain gage 2 including a bar or section of semiconductor material 3 and a bar or section of compensating material 4 mechanically in series with the semiconductor bar 3. The total length of the strain gage 2 is illustrated to be equal to $l_3$ and this length is marked off on the sample 1 as being the length of significant interest in which stress is to be measured. According to the teachings of the present invention the compensating section 4 of the strain gage 2 should be of a material with a relatively high coefficient of linear thermal expansion as compared to the coefficient of expansion of the semiconductor material 3. In the example described above wherein a silicon strain gage is utilized to measure the stress in a piece of steel, aluminum is used for compensating and the respective lengths of the two sections of the strain gage derived from the equations are $l_1$ equal to ${}^{15}\!/_{23}$ of $l_3$, hence, $l_2$ is equal to ${}^{8}\!/_{23}$ of $l_3$. It should be realized, however, that these relative lengths are merely preferred lengths in a specific example and that thet basic principle of the present invention should not be limited to these relative lengths.

In the example described and illustrated in FIGURE 1, the temperature compensating section 4 of the strain gage 2 constitutes about one-third of the total length of the gage so that the total length of the gage is about 1.5 times the length of the semiconductor material 3. This set of circumstances is not entirely desirable since it means that a considerable portion of the strain gage adjacent the sample to be measured is relatively insensitive to stresses in the sample. In order to alleviate this problem while maintaining the relatively low temperature sensitivity of the strain gage, the structure of FIGURE 1 is modified so that the strain in the compensating portion of the strain gage is reduced to a relatively low value as compared with the strain sensed by the semiconductor portion of the gage. In mathematical terms this can be expressed:

$$\left(\frac{\Delta l}{l}\right)_2 < \left(\frac{\Delta l}{l}\right)_1$$

where the subscript "2" again denotes the compensating material and the subscript "1" again refers to the semiconductor material.

In terms of the physical quantities of force, cross-sectional area, and Young's modulus, this equation can be rewritten:

$$\left(\frac{F}{AY}\right)_2 < \left(\frac{F}{AY}\right)_1$$

where

F is the force causing the stress in the sample to be measured,
A is the cross-sectional area of the strain gage, and
Y is a Young's modulus.

The quantities F and Y are approximately equal on both sides of the equation since the force will be the same on both portions of the gage and since Young's modulus is approximately the same for all materials. Therefore, the only way of satisfying the inequality is to make the cross-sectional area of the compensating material relatively large as compared to the cross-sectional area of the semiconductor material. This can easily be done in many ways.

Figure 2:
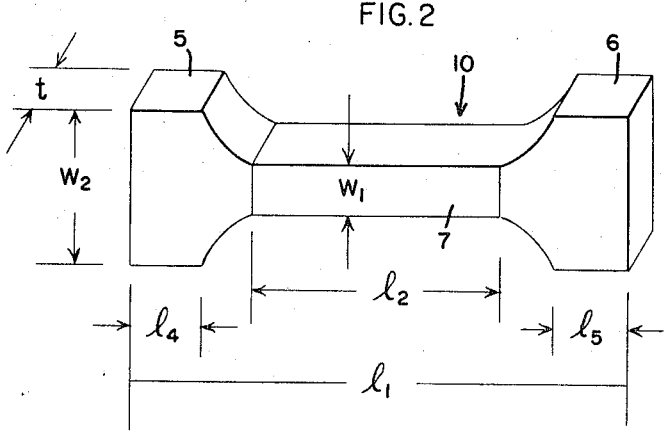
FIGURE 2 shows a semiconductor strain gage in accordance with the teachings of this invention.

One especially convenient design of a strain gage constructed to provide compensating material with a cross sectional area which is large relative to that of the semiconductor material is illustrated in FIGURE 2. In this embodiment, the composite compensated strain gage body 10 has half of the length ($l_3/2$) of the compensating material (sections 5 and 6 respectively) on each end of the semiconductor bar 7. Further, the cross-sectional area of each length, $l_4$ and $l_5$, of compensating material 5 and 6 is made considerably larger than that of the semiconductor bar 7. More specifically, as illustrated in FIGURE 2, the two lengths of compensating material 5 and 6 are composed of a relatively high coefficient of linear thermal expansion and have enlarged end portions of rectangular cross section which are necked down toward the centrally located semiconductor bar 7 (again of rectangular cross section) to correspond in cross-sectional dimensions to the semiconductor bar. In this embodiment, the thickness $t$ of all three members (5, 6 and 7) of the composite strain gage 10 is the same but the width $W_2$ of the enlarged end portions of compensating members 5 and 6 is much greater than the width $W_1$ of the semiconductor bar 7. Thus, the cross-sectional area of the compensating portion of the strain gage is much greater than that of the semiconductor portion. Illustrated mathematically the device of FIGURE 2 accomplishes the desired results as follows:

$$l_1 = l_3(a_3-a_2)/(a_1-a_2)$$
$$l_2 = l_3 - l_1$$
$$l_4 = l_5 = l_3/2$$
$$W_2 > W_1$$

Applicant has thus shown and described a means whereby a semiconductor strain gage can be made virtually insensitive to temperature variations. Applicant has illustrated a specific embodiment of a strain gage whereby such temperature compensation is achieved without sacrificing strain measuring sensitivity of the gage. Although specific materials have been suggested as exemplary and although a specific embodiment has been described for illustrative purposes, the invention is not limited thereto. Thus, although various modifications and design alternations may be suggested to those skilled in the art, the invention should be limited only by the spirit and scope of the appended claims.

What I claim as new and desire to secure by Letters Patent of the United States is:

1. In a semiconductor strain gage of the type utilized to measure strains in a sample which exhibits a relatively high coefficient of linear thermal expansion as compared to that of the semiconductor material, the improvement comprising placing mechanically in series with the semiconductor material a compensating material of a relatively high coefficient of linear thermal expansion as compared to that of said semiconductor material.

2. In a semiconducor strain gage for measuring stresses and strains in a sample a compensated gage element comprising,
   (a) a segment of semiconductor material of a first length,
   (b) a segment of a compensating material of relatively high coefficient of linear thermal expansion as compared to the coefficient of linear thermal expansion of said semiconductor material placed mechanically in series with said segment of semiconductor material and being of a second length,
   (c) said first length and said second length being such that the totality of said semiconductor segment and said compensating material segment exhibits a temperature expansion response approximately equal to that of the sample in which stresses and strains are being measured.

3. In a semiconductor strain gage as defined in claim 2 wherein said segment of compensating material of said second segment constitutes two equal lengths positioned at opposite ends of said segment of semiconductor material.

4. In a semiconductor strain gage a compensated gage element comprising,
   (a) a segment of semiconductor material of a first length, and of a first cross-sectional area,
   (b) a compensating material connected mechanically in series with said semiconductor segment,
      (1) said compensating material being of a relatively high coefficient of linear thermal expansion as compared to said semiconductor material,
      (2) said compensating material having a cross-sectional area relatively large as compared to the cross-sectional area of said semiconductor segment,
      (3) said compensating material having a total length such that the changes in length due to temperature variations of said strain gage including said semiconductor segment and said compensating material is approximately equal to the change in length of the sample in which stresses and strains are being measured.

5. In a semiconductor strain gage as defined in claim 4 wherein said segment of compensating material constitutes two equal lengths positioned at opposite ends of said segment of semiconductor material.

References Cited

UNITED STATES PATENTS

| | | | |
|---|---|---|---|
| 3,084,300 | 4/1963 | Sanchez | 338—2 |
| 3,102,420 | 9/1963 | Mason | 338—2 |
| 3,171,276 | 3/1965 | Sanchez et al. | 338—3 |
| 3,186,217 | 6/1965 | Pfann | 73—88.5 |
| 3,197,335 | 7/1965 | Leszynski | 338—308 |
| 3,215,568 | 11/1965 | Pfann | 338—2 |

RICHARD M. WOOD, *Primary Examiner.*

ANTHONY BARTIS, *Examiner.*

W. D. BROOKS, *Assistant Examiner.*